Feb. 9, 1954     J. F. LOWE     2,668,767
PIE AND PIE CRUST BLANK
Filed Feb. 21, 1952
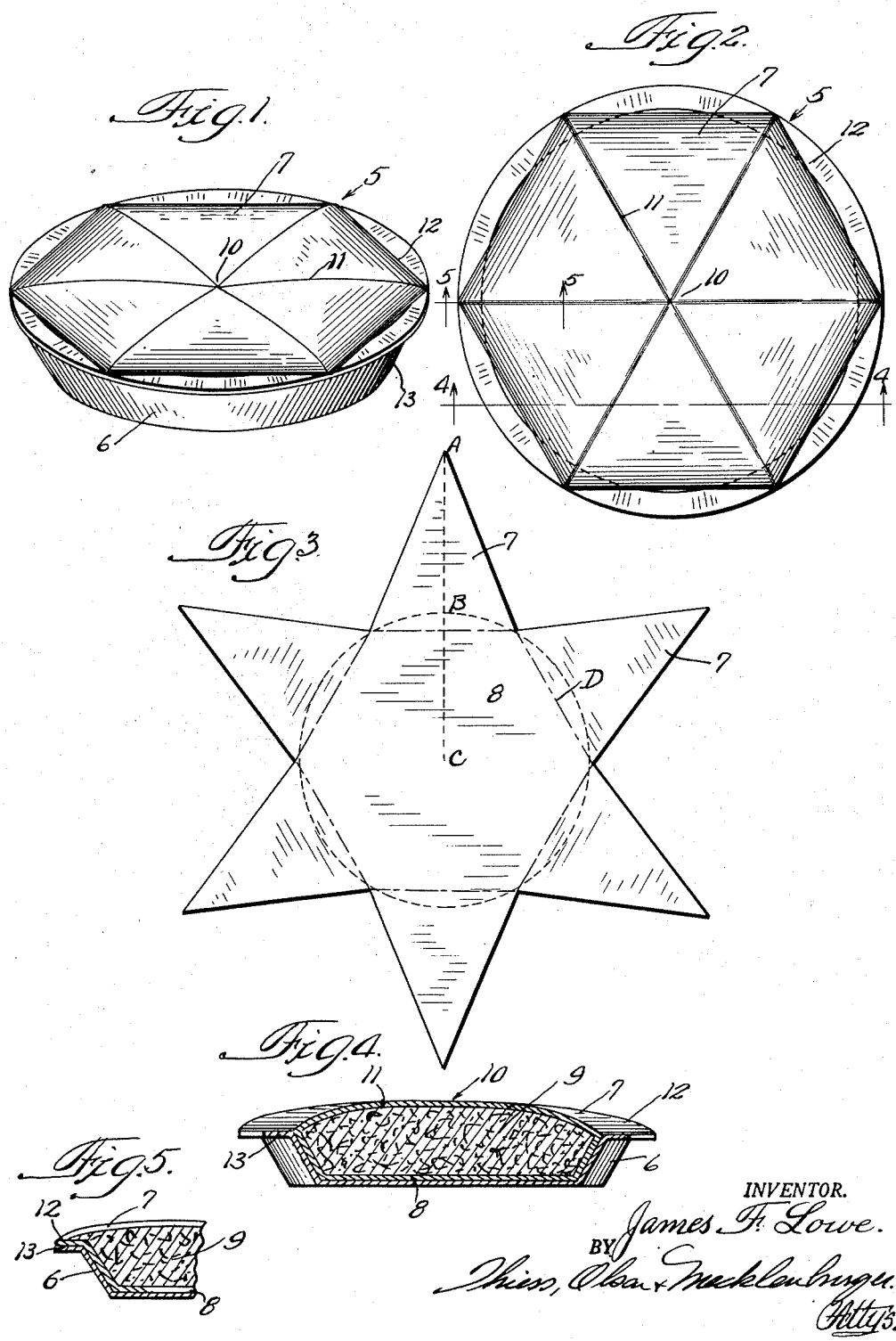
INVENTOR.
James F. Lowe.

Patented Feb. 9, 1954

2,668,767

UNITED STATES PATENT OFFICE 2,668,767

PIE AND PIE CRUST BLANK

James F. Lowe, Wayne Township, Du Page County, Ill.

Application February 21, 1952, Serial No. 272,758

5 Claims. (Cl. 99—92)

The present invention relates to improvements in the art of baking, and particularly in the making of a baked product commonly known as pie.

The invention further relates to the art of making and forming pie crusts and to methods of filling said crusts, either before or after baking.

In the ordinary time honored methods of making pies, it was customary to produce separately a lower and an upper crust; the lower crust was usually disposed in a baking tin known as a pie tin, whereafter the filling was placed into such crust, and a separate piece of dough was disposed thereover, the edges being placed into contact with the periphery of the lower crust; thereafter the pie was placed in a baking oven and baked.

Now, in so doing there is a considerable waste in dough and there is a doubling in thickness at the edge where the upper and lower crusts overlap and are usually pressed or forced together. Moreover, that part of the pie crust is therefore thicker and quite often is insufficiently baked, so that persons eating the pie will often reject the periphery of the crust for that reason. Self evidently this is a great waste of our food supplies.

Furthermore, the making of the upper and lower crusts separately involves a separate operation, and in view of the fact that pies are almost invariably substantially circular, there is considerable waste in cutting out the circular piece from a square piece of dough.

Accordingly it is one of the objects of the invention not only to simplify the making of pies, but to save considerable dough as well as effort in so doing.

The invention is illustrated more or less diagrammatically in the drawing filed concurrently herewith in which Fig. 1 is a perspective view of a pie made in accordance with the present invention, shown reposing in the baking tin;

Fig. 2 is a top plan view of the pie;

Fig. 3 is a plan view of a piece of dough from which the pie crust and hence the pie is made;

Fig. 4 is a cross section through the pie along the lines 4—4 of Fig. 2; and

Fig. 5 is a cross-section through a portion of the pie along the lines 5—5 of Fig. 2.

The invention is primarily predicated upon the inventive concept of making the lower crust and the upper crust of the pie of one single piece of rolled out suitable dough. The central or filling-supporting part of the pie may be polygonal, that is it may have four sides or more, as for example illustrated in Fig. 3, it may have six sides. The main portion may be substantially circular, and there may be extending outwardly therefrom a plurality, for example six, of radially extending upper-crust portions which are substantially in the form of isosceles triangles, the base of each of which is substantially a chord of a circle, the two sides being equal in length, with the altitude of the triangle, as measured from the base to the apex, being a little larger than the radius of the pie. The reason for this will subsequently be more fully explained.

Referring to the figures, the pie 5 may be baked in the pie tin 6 and in the particular form shown has six individual sectors 7 in its upper crust.

Taking for example a six sided pie, there may be produced a single piece of dough which is rolled and which is then cut either by a knife or a suitable cutter into a star-shaped piece such as is shown in Fig. 3, this piece having a central portion 8 and the therefrom radially extending triangular portions 7. It will be noticed that the distance from the periphery of the circle defining the central filling supporting portion of the pie to the apex of a sector is somewhat greater than the radius of the said central portion. This is illustrated in Fig. 3 by the dotted line running from the apex A of one of the sectors 7 to the center C of the pie. The point B is the point of intersection between the circle which defines the periphery of the pie and said line A—C, and the distance A—B is greater than the distance B—C. The reason for this is as follows: Inasmuch as the pie filling takes up space, for example as does the filling 9 in Figs. 4 and 5, it would be necessary for the extending portions 7 to come together at the center of the pie so as not to leave an opening at that point. Moreover, some of the crust is used to form the edge or periphery of the pie. Accordingly the distance A—B should be slightly larger in order to assure the substantial meeting of these various sectors at 10, unless an opening is to be left at the center of the pie.

When folding back the upper crust portions consisting of the six sectors 7 there will naturally be left lines of cleavage 11, which, however, serve a useful function in that they permit the escape of steam and gases from the filling of the pie, which is quite necessary. In fact it is well known in the baking art to provide the upper crust of a pie with deliberately made cuts or openings.

In bending back the sectors 7 there will be automatically formed a rim 12 as shown in Figs. 1, 2 and 4. This rim of course is formed by the periphery of the circle or polygon, and hence does not appear in Fig. 3. The sectors tend to bend along lines D, shown in broken lines, in Fig. 3.

As can be seen from Fig. 4, the bottom or lower crust 8 lies on the bottom of the tin 6 and extends along the upwardly sloping sides thereof. At the apex of each sector 7, the edge of the pie may overlie the rim 13 of the pie tin, as best seen in Fig. 5, while at the intermediate points it lies just inside of the rib, as seen in Fig. 4. Of course the larger the number of sides, the more nearly will the pie assume a circular appearance. Most commercial pies made for the restaurant trade are made so as to be divided into seven or eight servings, hence seven-sided and 8-sided pies would represent commercially used forms. The invention is illustrated by a six-sided pie for clarity of illustration and description.

When a pie is made in accordance with the present invention, the defining periphery or edge is hence no thicker than is either the lower or upper crust, thus saving considerable dough, and also being more conducive to the consumption of the said edge portions. Moreover, the edge portions will be baked to the same extent as the rest of the upper crust, and also will contain some of the filling, which is a very desirable feature.

A further advantage is in the speed of assembly of the pie when made by pie making machinery.

As is well known, commercial pies are baked in continuous ovens through which the pies pass on a suitable conveyor belt or are pulled through by chains or other means for imparting motion to the pie tins. Quite often pies are baked in entirely closed baking forms which perform similarly to a waffle iron, that is to say, the bottom as well as the top of the pie are covered during the baking operation. Irrespective, however, as to whether such forms are used or whether the baking is accomplished in the pie tin, the operation is as follows:

The dough is rolled out, then cut into the desired form, for instance the six-sided star shown in Fig. 3, whereafter the center portion 8 is placed in the pie tin 6, the filling put in the pie, and the sectors 7 then flipped over on top of the filling. This flipping over may be done either by hand or quite conveniently by suitable moving fingers associated with the pie baking machine. In any event there is no necessity for cutting out two separate pieces, placing the upper crust on the lower and then pushing down a die around it to force them together, as has been customary in the past.

A still further advantage lies in the pleasing appearance of a pie thus made, and its subdivision into a number of parts preselected by the maker or baker. Thus the pie may be four-sided (square), five-sided, six-sided, seven-sided, or eight-sided, or even more, depending upon the desire of the maker, so that the pieces may be cut therefrom along the natural cleavage lines 11, so that the pie will be divided into substantially equal portions.

It will of course be understood by those skilled in the art that the segments left from the circular part of the dough from which the star-shaped pie crust is cut may be rerolled and reused so that there is no waste at all of either dough or pie crust. By suitably staggering the star-shaped sections so as to obtain an interlock of pattern, there will be less dough left over after each cutting of a star than when cutting circular crusts, as in the prior art practice.

The application of the principle of the present invention to other forms of baked goods than pies, such possibly as filled coffee cake, covered cheese cakes, and in fact any other filled type of bakery products, is to be considered within the scope and intents of the present invention.

Applicant claims:

1. A star-shaped pie crust blank made of dough and having a substantially circular potential bottom crust portion and radially therefrom outwardly extending triangular upper-crust pieces foldable along chords of said circular portion, the altitude of said pieces being greater than the radius of said circular portion.

2. A pie crust blank made of dough and having a central polygonal lower-crust-forming portion of a given radius X and a number of sides Y, and radially outwardly extending triangular pieces in number equal to Y and having an altitude greater than that of the length of radius X.

3. A pie crust blank made of dough and having a substantially circular lower-crust-forming portion and therefrom radially outwardly extending isosceles triangular potential upper-crust portions, the bases of said triangular pieces being chords of said circular portion and their altitudes being greater than the radius of said circular portion.

4. A pie crust blank made of dough and having a central polygonal potential bottom crust portion having more than four sides and radially therefrom extending triangular upper crust pieces foldable along the polygonal portion back against the same so as to meet at the center thereof, the altitude of said triangular pieces being greater than the radius of said polygonal portion.

5. A polygonal pie containing a filling and having its lower and upper crust portions made of a unitary piece of dough, the lower crust portion thereof being in the form of a polygon having at least five sides and the upper crust portion being formed of radially therefrom extending isosceles triangular portions the base of each of which is a side of said polygon, the altitude of the triangular portions being greater than the radius of said polygon, so that said triangular pieces, when folded back over the filling, will substantially meet at the center of the top of the pie, and the sides of said pieces being substantially in contact with each other.

JAMES F. LOWE.

References Cited in the file of this patent

"Encyclopedic Cookbook" by Ruth Berolzheimer, 1948, Grosset and Dunlap, New York, page 274.

"Everybody's Cookbook" by Lord, revised edition, Harcourt, Brace and Company, New York, pages 251 and 605.